United States Patent
Oveis Gharan et al.

(10) Patent No.: US 10,819,432 B1
(45) Date of Patent: Oct. 27, 2020

(54) FAST ESTIMATION OF CHROMATIC DISPERSION

(71) Applicants: Shahab Oveis Gharan, Ottawa (CA); Lukas Jakober, Ottawa (CA)

(72) Inventors: Shahab Oveis Gharan, Ottawa (CA); Lukas Jakober, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 16/687,521

(22) Filed: Nov. 18, 2019

(51) Int. Cl.
*H04B 10/2513* (2013.01)
*H04B 10/079* (2013.01)
*H04B 10/61* (2013.01)
*H04B 10/60* (2013.01)
*H04B 10/2507* (2013.01)
(Continued)

(52) U.S. Cl.
CPC . *H04B 10/25133* (2013.01); *H04B 10/07951* (2013.01); *H04B 10/6161* (2013.01); *H04B 10/25* (2013.01); *H04B 10/2507* (2013.01); *H04B 10/2513* (2013.01); *H04B 10/50* (2013.01); *H04B 10/505* (2013.01); *H04B 10/60* (2013.01); *H04B 10/61* (2013.01); *H04B 10/616* (2013.01)

(58) Field of Classification Search
None
See application file for complete search history.

(56) References Cited

U.S. PATENT DOCUMENTS

| 7,701,842 B2 | 4/2010 | Roberts et al. | |
| 2007/0092259 A1* | 4/2007 | Bontu | H04J 14/06 398/147 |

(Continued)

OTHER PUBLICATIONS

Godard, "Passband timing recovery in an all-digital modem receiver", IEEE Trans. Commun. 26(5), 517-523, 1978.
(Continued)

*Primary Examiner* — Darren E Wolf
(74) *Attorney, Agent, or Firm* — Integral Intellectual Property Inc.; Amy Scouten; Miriam Paton (57) ABSTRACT

A receiver is configured to calculate a representation of a received signal conveying symbols at a frequency $f_S$, the representation comprising non-zero components at frequencies of magnitudes exceeding $f_S/2$. The receiver calculates a first term comprising a function of a phase difference between the representation at a first pair of frequencies separated by a gap $\Delta$ and comprised within a first band of width $2\delta$ centered at $f_S/2$, and a second term comprising a function of a phase difference between the representation at a second pair of frequencies separated by the gap $\Delta$ and comprised within a second band of width $2\delta$ centered at $-f_S/2$, wherein $\Delta<2\delta$, and wherein the higher frequency of the first pair and the higher frequency of the second pair are separated by the frequency $f_S$. An estimate of chromatic dispersion in the received signal is calculated based on the first term and the second term.

20 Claims, 5 Drawing Sheets (51) Int. Cl.
 *H04B 10/25* (2013.01)
 *H04B 10/50* (2013.01)

(56) References Cited

U.S. PATENT DOCUMENTS

| | | | | |
|---|---|---|---|---|
| 2008/0260077 | A1* | 10/2008 | Poirrier | H04B 10/07951 375/346 |
| 2010/0021179 | A1* | 1/2010 | Kikuchi | H04B 10/6161 398/183 |
| 2010/0189445 | A1* | 7/2010 | Nakashima | H04B 10/65 398/152 |
| 2011/0200339 | A1* | 8/2011 | Komaki | H04B 10/6971 398/208 |

OTHER PUBLICATIONS

Hauske, et al., "Precise, Robust and Least Complexity CD estimation", Optical Fiber Communication Conference, Paper JWA032, 2011.

Soriano, et al., "Chromatic Dispersion Estimation in Digital Coherent Receivers", Journal of Lightwave Technology, vol. 29, No. 11, Jun. 1, 2011.

Sui, et al., "Fast and Robust Blind Chromatic Dispersion Estimation Using Auto-Correlation of Signal Power Waveform for Digital Coherent Systems", Journal of Lightwave Technology, vol. 31, No. 2, Jan. 15, 2013.

\* cited by examiner

FAST ESTIMATION OF CHROMATIC DISPERSION

TECHNICAL FIELD

This document relates to the technical field of optical communications.

BACKGROUND

In an optical communication network, an optical transmitter may transmit an optical signal over a communication channel to an optical receiver, where the signal is representative of digital information in the form of symbols or bits. The receiver may process the signal received over the communication channel to recover estimates of the symbols or bits. Various components of the optical communication network may contribute to signal degradation, such that the signal received at the receiver comprises a degraded version of the signal that was generated at the transmitter. Degradation or distortion may be caused by polarization mode dispersion (PMD), polarization dependent loss or gain (PDL or PDG), amplified spontaneous emission (ASE), wavelength-dependent dispersion or chromatic dispersion (CD), and other effects.

CD causes a signal to broaden as it travels down a length of fiber. This broadening is the result of different velocities experienced by different spectral components of the signal. A technique known as dispersion compensation may be used to compensate for the net CD in a given link. Dispersion compensation is achieved by providing a negative dispersion to oppose the positive dispersion in the link. Dispersion compensation may be performed using some combination of pre-compensation at the transmitter and post-compensation at the receiver. The sum of the CD pre-compensation and post-compensation should always be substantially equal to the net CD of the link but with the opposite sign, so as to substantially compensate for the net CD of the link.

SUMMARY

According to a broad aspect, a receiver apparatus is configured to receive a communications signal conveying symbols at a symbol frequency $f_S$. The receiver apparatus comprises circuitry configured to perform a method for estimating chromatic dispersion (CD) in the communications signal. The method comprises calculating a representation of the communications signal, wherein the representation comprises non-zero components at frequencies of magnitudes exceeding $f_S/2$. The method further comprises calculating a first term comprising a function of a phase difference between the representation at a first pair of frequencies separated by a gap $\Delta$ and comprised within a first band of width $2\delta$ centered at $f_S/2$, where $\Delta < 2\delta$. The method further comprises calculating a second term comprising a function of a phase difference between the representation at a second pair of frequencies separated by the gap $\Delta$ and comprised within a second band of width $2\delta$ centered at $-f_S/2$, where the higher frequency of the first pair and the higher frequency of the second pair are separated by the symbol frequency $f_S$. The method further comprises calculating the estimate of CD in the communications signal based on the first term and the second term.

According to some examples, the method comprises calculating a complex metric using the first term and the second term, and calculating the estimate of CD in the communications signal based on an angle of the complex metric.

According to some examples, the method comprises calculating the complex metric using complex conjugate multiplication.

According to some examples, the method comprises calculating the first term and the second term using complex conjugate multiplication.

According to some examples, the method comprises calculating a plurality of different versions of the first term at a respective plurality of different first pairs of frequencies, calculating a plurality of different versions of the second term at a respective plurality of different second pairs of frequencies, and calculating the estimate of CD in the communications signal based on a combination of the plurality of different versions of the first term and the plurality of different versions of the second term.

According to some examples, the combination applies different weights to the different versions of the first term based on respective magnitudes of the different first pairs of frequencies, and wherein the combination applies different weights to the different versions of the second term based on respective magnitudes of the different second pairs of frequencies.

According to some examples, the method comprises calculating a plurality of different representations corresponding to a respective plurality of time intervals, calculating a plurality of different versions of the complex metric corresponding to the respective plurality of different representations, and calculating the estimate of CD in the communications signal based on the plurality of different versions of the complex metric.

According to some examples, the method comprises calculating a summation of the plurality of different versions of the complex metric, and calculating the estimate of CD in the communications signal based on an angle of the summation.

According to some examples, the representation comprises frequency components corresponding to a plurality of polarizations, and the method comprises calculating a plurality of first terms corresponding to the respective plurality of polarizations, calculating a plurality of second terms corresponding to the respective plurality of polarizations, and calculating the estimate of CD in the communications signal based on the plurality of first terms and the plurality of second terms.

According to some examples, the method comprises calculating a new version of the complex metric based on a different value of the gap $\Delta$, and adjusting the estimate of CD based on the new version of the complex metric.

DETAILED DESCRIPTION

Figure 1:
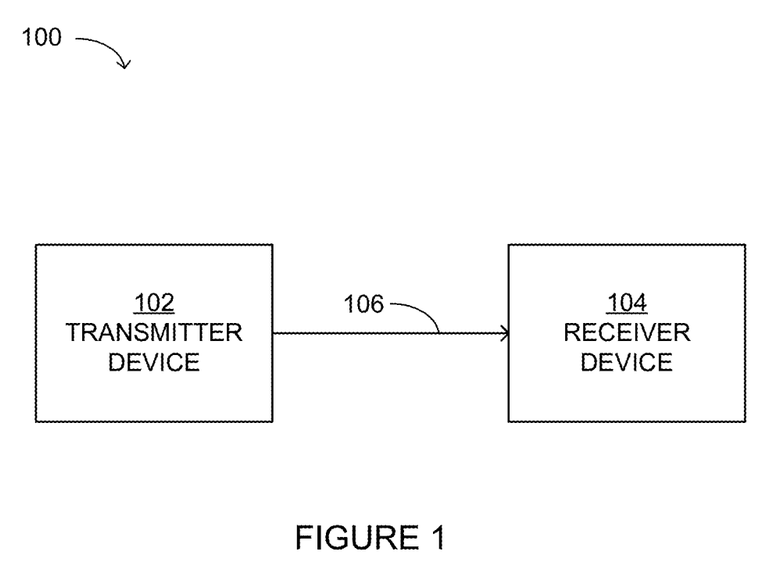
FIG. 1 illustrates an example communication network in accordance with some examples of the technology disclosed herein.

FIG. 1 illustrates an example communication network 100, in accordance with some examples of the technology disclosed herein.

The communication network 100 may comprise at least one transmitter device 102 and at least one receiver device 104, where the transmitter device 102 is capable of transmitting signals over a communication channel, such as a communication channel 106, and where the receiver device 104 is capable of receiving signals over a communication channel, such as the communication channel 106. According to some examples, the transmitter device 102 is also capable of receiving signals. According to some examples, the receiver device 104 is also capable of transmitting signals. Thus, one or both of the transmitter device 102 and the receiver device 104 may be capable of acting as a transceiver. According to one example, the transceiver may comprise a modem. The signals transmitted in the communication network 100 may be representative of digital information in the form of symbols or bits.

The communication network 100 may comprise additional elements not illustrated in FIG. 1. For example, the communication network 100 may comprise one or more additional transmitter devices, one or more additional receiver devices, one or more controller devices, and one or more other devices or elements involved in the communication of signals in the communication network 100.

According to some examples, the signals that are transmitted and received in the communication network 100 may comprise any combination of electrical signals, optical signals, and wireless signals. For example, the transmitter device 102 may comprise a first optical transceiver, the receiver device 104 may comprise a second optical transceiver, and the communication channel 106 may comprise an optical communication channel. According to one example, one or both of the first optical transceiver and the second optical transceiver may comprise a coherent modem.

Each optical communication channel in the communication network 100 may include one or more links, where each link may comprise one or more spans, and each span may comprise a length of optical fiber and one or more optical amplifiers.

Where the communication network 100 involves the transmission of optical signals, the communication network 100 may comprise additional optical elements not illustrated in FIG. 1, such as wavelength selective switches, optical multiplexers, optical de-multiplexers, optical filters, and the like. Frequency division multiplexing (FDM) may be used to digitally divide up the modulated optical spectrum into a plurality of subcarriers, each with a different center frequency, such that each subcarrier may be used to transmit a signal that is representative of a different stream of symbols. In this manner, a plurality of symbol streams may be simultaneously communicated, in parallel, over the optical communication channel 106. FDM is possible when the frequencies of the subcarriers are sufficiently separated that the bandwidths of the signals do not significantly overlap. Each different subcarrier corresponds to a different FDM sub-band, also referred to as a FDM channel. Wavelength division multiplexing (WDM) may be used to transmit a plurality of data streams in parallel, over a respectively plurality of carriers, where each carrier is generated by a different laser.

According to some examples, a signal generated at the transmitter device 102 may be representative of a stream of symbols to be transmitted at times set by a transmitter symbol clock, where the frequency of the transmitter symbol clock is set to be, for example, a certain ratio or fraction of a transmitter sampling frequency which may be set by a voltage controlled oscillator (VCO) and associated clocking circuits at the transmitter device 102. The frequency of the symbol clock at the transmitter device 102 may be referred to as the transmitter symbol frequency or symbol rate or baud rate. At the receiver device 104, estimates of the symbols may be recovered by sampling the received signal at times set by a receiver sample clock, where the frequency of the receiver sample clock may be set by a VCO at the receiver device 104. The frequency of the sample clock at the receiver device 104 may be referred to as the receiver sample frequency or sample rate. The receiver sample rate may be selected to satisfy the Nyquist criterion for the highest anticipated transmitter symbol rate. For example, if the transmitter symbol rate is expected to be 10 GBaud, then the receiver sample rate may be set to 20 GHz. U.S. Pat. No. 7,701,842 to Roberts et al. describes using a fractional sample rate that is less than double the symbol rate. A symbol clock at the receiver device 104 may be set to be a certain ratio or fraction of the receiver sample rate and, after initial processing, the information stream may be resampled to a receiver symbol rate that is equal to the transmitter symbol rate. Herein, the term "samples" is generally used to refer to samples taken at the receiver symbol rate, or at some oversampling rate, depending upon the context.

Where the sample rate satisfies the Nyquist criterion, application of a Nyquist-pulse shape has the desirable effects of achieving zero inter-symbol interference (ISI) in the time domain and minimum noise bandwidth. A well-known example of a Nyquist pulse shape is a raised cosine filter. It is common practice to split the Nyquist filter, such as the raised cosine filter, between a transmitter and receiver by applying, for example, a root-raised cosine filter at each device, also known as matched filters. The shape of the raised cosine achieved by the pair of matched filters is characterized by a roll-off factor $\rho$.

The accuracy of the symbol estimates depends on the precise timing of the samples in relation to the timing of the symbols in the received signal. For example, symbol sample points that are closer to transitions between different signals that are representative of adjacent symbols may provide noisier symbol estimates than symbol sample points that are centered between the transitions. As result of noise in the communication network 100, the relationship between the symbol timing and the sample timing is constantly changing. Such timing errors could evolve due to a frequency offset between transmitter and receiver sampling clocks (which causes a linear phase change in time) and/or a time-varying clock phase offset between transmitter and receiver clocks which are generated by different parts of Phase Locked Loops (PLLs), such as VCOs and reference clocks. Optimum sample timing at a receiver device, such as the receiver device 104, may be achieved using a process known as clock recovery or timing recovery. In general, clock recovery is implemented based on the measurements output by a clock phase detector.

Various methods for clock phase detection are known. One such method is described by Godard in "Passband timing recovery in an all-digital modem receiver," *IEEE*

Trans. Commun. 26(5), 517-523, 1978. This method, generally known as the Godard method, involves calculations which are performed on frequency components within the roll-off regions of a raised cosine spectrum. Specifically, complex conjugate multiplication is applied to pairs of counterpart frequency components in the positive and negative roll-off regions, respectively, where each pair is separated by the symbol rate. The product of each pair contains clock phase information. The complex conjugation multiplication may be applied to many different Godard pairs over a range of frequencies, and the results may be averaged to obtain an estimate of the clock phase offset.

Various elements and effects in the communication network 100 may result in the degradation of signals transmitted between different devices. Thus, a signal received at the receiver device 104 may comprise a degraded version of a signal transmitted by the transmitter device 102. For example, where the communication channel 106 is an optical communication channel, the signal transmitted by the transmitter device 102 may be degraded by polarization mode dispersion (PMD), polarization dependent loss or gain (PDL of PDG), state of polarization (SOP) rotation, amplified spontaneous emission (ASE) noise, and wavelength-dependent dispersion or chromatic dispersion (CD), and other effects. The degree of signal degradation may be characterized by signal-to-noise ratio (SNR), or alternatively by noise-to-signal ratio (NSR).

CD causes a signal to broaden as it travels down a length of fiber. This broadening is the result of different velocities experienced by different spectral components of the signal. A technique known as dispersion compensation may be used to compensate for the net CD in a given link. Dispersion compensation is achieved by providing a negative dispersion to oppose the positive dispersion in the link. Dispersion compensation may be performed using some combination of CD pre-compensation at the transmitter and CD post-compensation at the receiver. The sum of the CD pre-compensation and CD post-compensation should always be substantially equal to the net CD of the link but with the opposite sign, so as to substantially compensate for the net CD of the link. The amount of CD detected in a communications signal at a receiver may be referred to as the residual CD, and is equivalent to any remaining portion of the net CD in the link that was not already compensated for by the CD pre-compensation applied at the transmitter. Ultimately, any residual CD in the communications signal should be compensated for by the CD post-compensation applied at the receiver.

The first stages of start-up of a receiver, including clock recovery, laser frequency-error recovery, and linear equalizer training, may depend on a priori knowledge of the residual CD in the communications signal, which may be characterized by a CD coefficient $\beta$. Where the net CD of the link and the amount of CD pre-compensation applied at the transmitter are known, the residual CD may be inferred. However, where one or both of the net CD and amount of CD pre-compensation are unknown, then it may be necessary perform measurements to estimate the residual CD.

Various techniques for estimation of the residual CD in a link are known. A common technique involves applying a filter at the receiver that is intended to invert the residual CD in the link (i.e., a CD post-compensation filter), where the filter is characterized by an unknown value of the CD coefficient $\beta$. According to some examples, the filter is applied while sweeping through a series of different values of $\beta$, and the value of that results in a peak in the strength of the Godard clock signal (or variant thereof) is used to estimate the residual CD in the link. Examples of this technique are described by Hauske et al. in "Precise, Robust and Least Complexity CD estimation," in *Optical Fiber Communication Conference*, Paper JWA032, 2011, and by Sui et al. in "Fast and Robust Blind Chromatic Dispersion Estimation Using Auto-Correlation of Signal Power Waveform for Digital Coherent Systems," *Journal of Lightwave Technology*, Volume 31, Issue 2, 2013. The requirement to scan through multiple values of $\beta$ makes this a slow technique for CD estimation, adding significant delay to the start-up of the receiver device (also referred to as the acquisition procedure). Furthermore, the methods described by Hauske et al. and Sui et al. are sensitive to clock frequency offset between the transmitter and the receiver, and are also sensitive to fiber optical impairments such as differential group delay (DGD), SOP rotation, and PDL.

Soriano et al. describe two methods for CD estimation in "Chromatic Dispersion Estimation in Digital Coherent Receivers," *Journal of Lightwave Technology*, Volume 29, Issue 11, 2011. The first method is similar to those described by Hauske et al. and Sui et al., and involves sweeping through multiple CD values and analyzing a time-domain or frequency-domain metric which is either derived based on a clock metric or an error magnitude metric measured from the output of an adaptive equalizer. Examples of such could be derived from deviation of signal magnitude from a constant at the output of the adaptive equalizer such as a blind constant modulus algorithm (CMA) assuming a M-ary phase shift keying (M-PSK) signal is sent. This is referred to as a best-match search. Similar to the methods of Hauske et al. and Sui et al., this first method is slow. Furthermore, the method is sensitive to clock frequency offset. For the scenarios that the metric is derived from clock strength, the metric will be sensitive to DGD, SOP rotation, and PDL. These methods are also sensitive to clock cycle slip, thereby limiting the amount of time over which the algorithm may sweep the CD value. The second method described by Soriano et al. assumes that an adaptive equalizer is able to run and learn the channel response. Hence, the CD value is learned from the filter response of the equalizer. In practice, however, this method would not be feasible because adaptive equalizers have a small number of taps, and much smaller than the memory contained within time impulse response of the CD. Finally, because the transmitter and receiver sampling clocks, as well as transmitter and receiver laser frequencies, are not locked, the adaptive equalizer can potentially lose tracking of the channel response.

Figure 2:
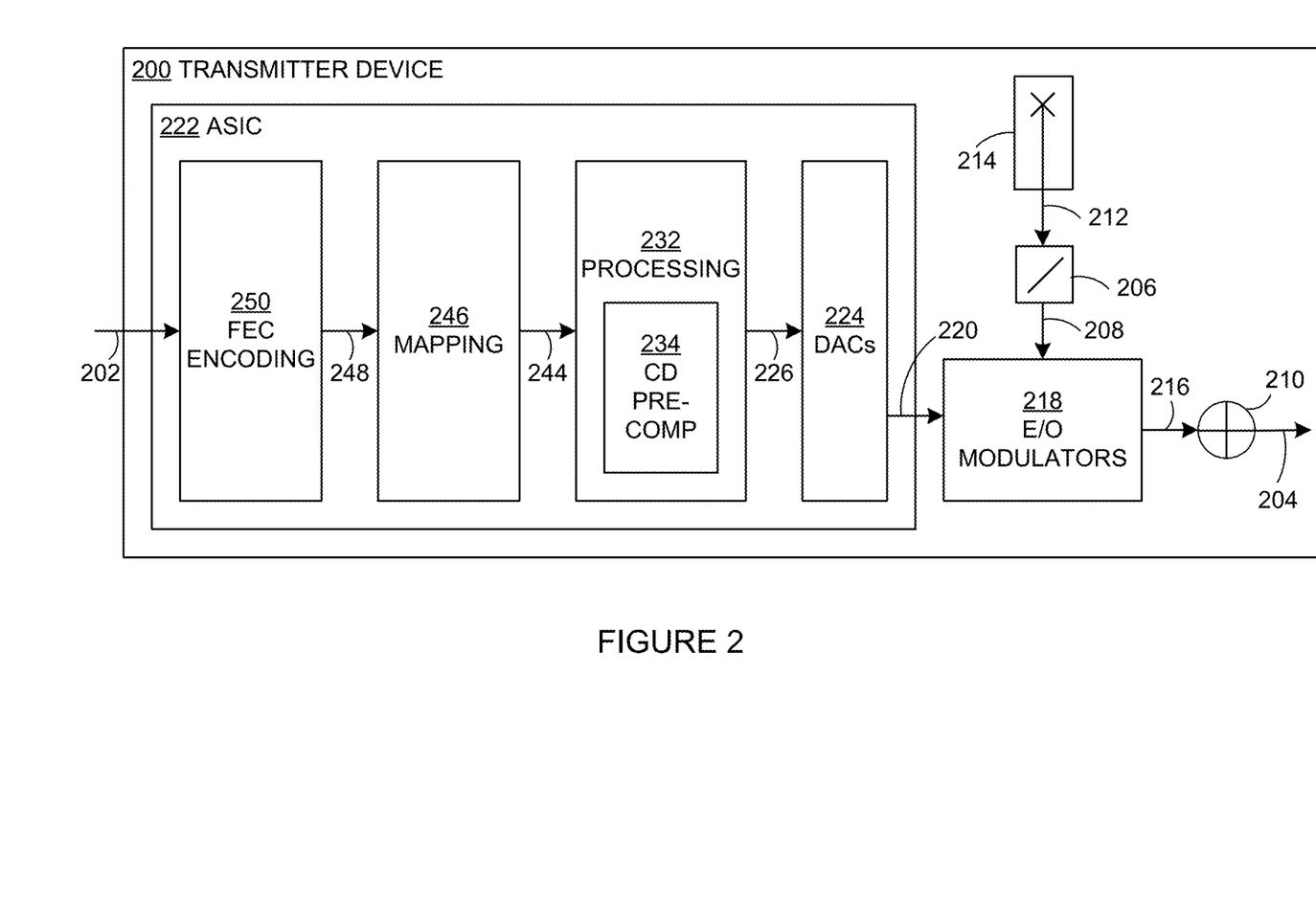
FIG. 2 illustrates an example transmitter device in accordance with some examples of the technology disclosed herein.

FIG. 2 illustrates an example transmitter device 200, in accordance with some examples of the technology disclosed herein. The transmitter device 200 is an example of the transmitter device 102. The transmitter device 200 may comprise additional components that are not described in this document.

The transmitter device 200 is configured to transmit an optical signal 204 which is representative of information bits (also referred to as client bits) 202. According to some examples, the optical transmitter 200 employs polarization-division multiplexing (PDM). In other examples, generation of the optical signal 204 may involve alternative techniques, such as single polarization modulation, modulation of an unpolarized carrier, mode-division multiplexing, spatial-division multiplexing, Stokes-space modulation, polarization balanced modulation, and the like. A laser 214 is configured to generate a continuous wave (CW) optical carrier 212. A polarizing beam splitter 206 is configured to split the CW optical carrier 212 into polarized components 208 that are modulated by electrical-to-optical (E/O) modulators 218 to produce modulated polarized optical signals 216 that are combined by a beam combiner 210, thus yielding the optical signal 204. In some examples (not shown), the polarizing beam splitter 206 and the beam combiner 210 may be replaced with simple power splitters and combiners. Together, elements such as the E/O modulators 218, the laser 214, the beam splitter 206, and the beam combiner 210 may form a communication interface configured to transmit optical signals to other devices in a communication network.

The transmitter device 200 may comprise an application specific integrated circuit (ASIC) 222. According to some examples, the ASIC 222 may be configured to apply FEC encoding 250 to the client bits 202 to generate FEC-encoded bits 248. The FEC-encoded bits 248 may be mapped to one or more streams of data symbols 244 according to a mapping 246. According to some examples, the symbols 244 may comprise a plurality of parallel streams of symbols where each stream corresponds to a different FDM subcarrier.

The ASIC 222 may be configured to apply processing 232 to the one or more streams of symbols 244. The processing 232 may comprise digital up-sampling of the symbols 244. The processing 232 may further comprise operations that are subsequently applied to the sampled waveform, either in the time domain or the frequency domain. Such operations may include pulse shaping, FDM subcarrier multiplexing, distortion pre-compensation, and CD pre-compensation 234. The processing 232 may include the application of one or more filters, which may involve the application of one or more Fast Fourier Transforms (FFTs) and one or more corresponding inverse FFTs (IFFTs).

Application of the processing 232 to the one or more streams of symbols 244 results in digital drive signals 226, which comprise an electrical representation of the optical spectrum that is to be used in the transmission of the optical signal 204. For example, the digital drive signals 226 may comprise four signals corresponding to the I and Q components of the X polarization and the I and Q components of the Y polarization.

The transmitter device 200 comprises a plurality of digital-to-analog converters (DACs) 224 which may be used to convert the digital drive signals 226 into respective analog drive signals 220. Although illustrated as comprised in the ASIC 222, in an alternate implementation the DACs 224 or portions thereof may be separate from the ASIC 222. The DACs 224 may be controlled by a signal received from a VCO (not shown). The analog drive signals 220 are used to drive the E/O modulators 218, which ultimately results in the optical signal 204.

The optical signal 204 is representative of the stream of symbols 244. The symbol rate is dependent on a signal generated by a VCO (not shown). In practice, imperfections in the operation of the VCO may result in small variations in the symbol phase away from a constant symbol rate. Similarly, imperfections in a reference clocks onto which the VCO is locked adds jitter to the transmitter clock phase. These variations are one source of the jitter to be corrected and tracked by clock recovery at a receiver device.

Figure 3:
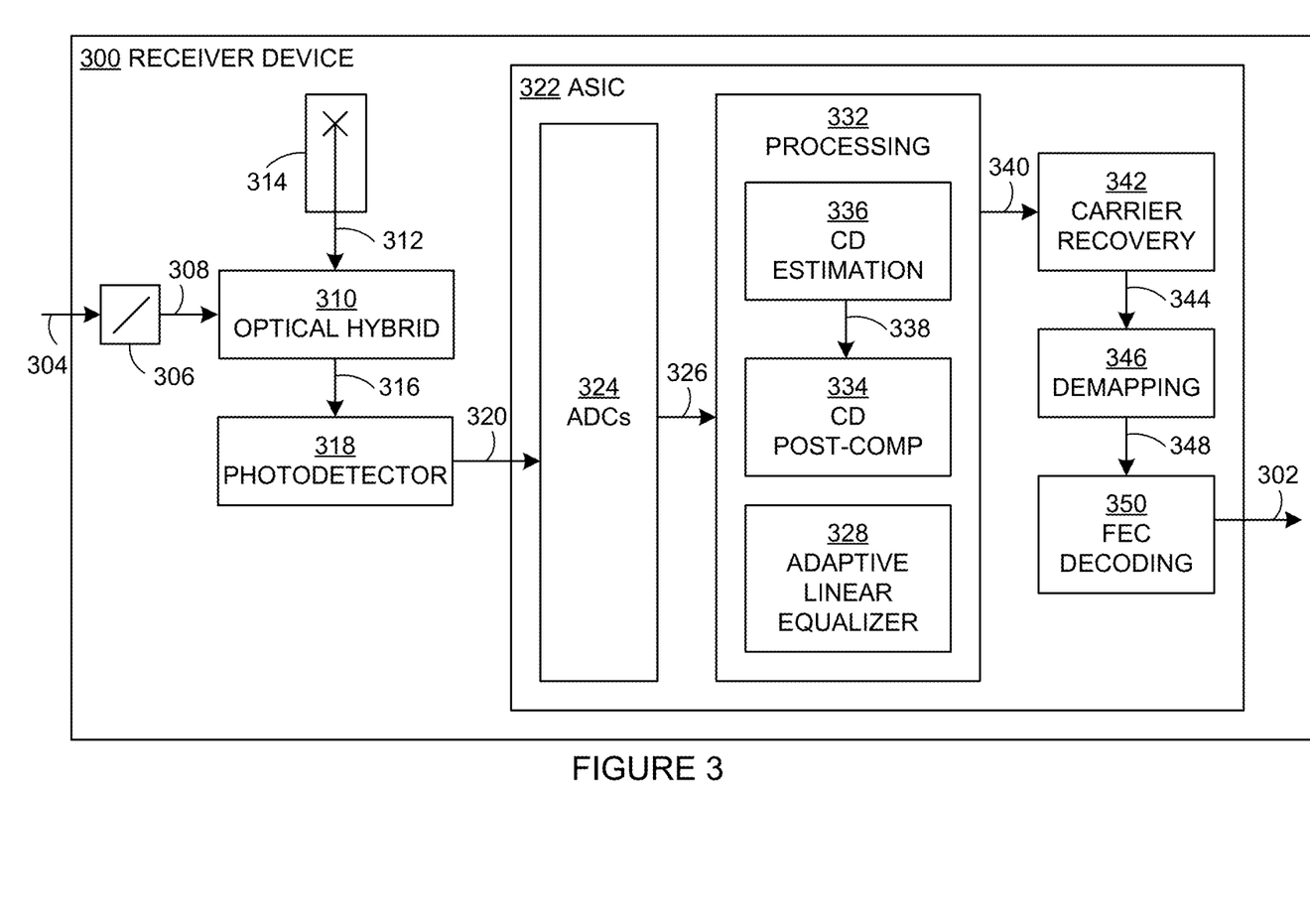
FIG. 3 illustrates an example receiver device in accordance with some examples of the technology disclosed herein.

FIG. 3 illustrates an example receiver device 300, in accordance with some examples of the technology disclosed herein. The receiver device 300 is an example of the receiver device 104. The receiver device 300 may comprise additional components that are not described in this document.

The receiver device 300 is configured to recover corrected client bits 302 from a received optical signal 304. The received optical signal 304 may comprise a degraded version of an optical signal generated by a transmitter device, such as the transmitter device 102 or 200. A polarizing beam splitter 306 is configured to split the received optical signal 304 into polarized components 308. According to one example, the polarized components 308 may comprise orthogonally polarized components corresponding to an X polarization and a Y polarization. An optical hybrid 310 is configured to process the components 308 with respect to an optical signal 312 produced by a laser 314, thereby resulting in optical signals 316. Photodetectors 318 are configured to convert the optical signals 316 output by the optical hybrid 310 to analog signals 320. According to one example, the analog signals 320 may comprise four signals corresponding, respectively, to the dimensions XI, XQ, YI, YQ, where XI and XQ denote the in-phase and quadrature components of the X polarization, and YI and YQ denote the in-phase and quadrature components of the Y polarization. Together, elements such as the beam splitter 306, the laser 314, the optical hybrid 310 and the photodetector 318 may form a communication interface configured to receive optical signals from other devices in a communication network.

The receiver device 300 may comprise an ASIC 322. The ASIC 322 may comprise analog-to-digital converters (ADCs) 324 which are configured to sample the analog signals 320, and to generate respective digital signals 326. Although illustrated as comprised in the ASIC 322, in an alternate implementation the ADCs 324 or portions thereof may be separate from the ASIC 322. The ADCs 324 sample the analog signals 320 periodically at a sample rate that is based on a signal received from a VCO at the receiver device 300 (not shown). Similar to the VCO at the transmitter device 200, imperfections in the operation of the VCO at the receiver device 300 may result in small variations in the sample phase away from a constant sample rate. These variations are an additional source of jitter to be corrected and removed by clock recovery.

The ASIC 322 is configured to apply digital processing 332 to the digital signals 326. The processing 332 may comprise the application of one or more filters to the digital signals 326, which may involve the application of one or more FFTs and one or more corresponding IFFTs. The processing 332 may also include down-sampling, FDM subcarrier de-multiplexing, distortion post-compensation, and CD post-compensation 334.

The processing 332 may comprise the application of an adaptive linear equalizer 328 to compensate for low-memory linear imperfections of the fiber, that is, any linear impairment whose time-domain impulse response is short, such as DGD, PDL, and SOP.

The processing 332 further comprises clock recovery (not shown), which be implemented by circuitry which makes use of a clock phase detector (not shown) configured to use the digital signals 326 to generate measurements of phase offset of the sample timing relative to the timing of the symbols represented by the analog signals 320. In general, clock phase offset may be understood to refer to the phase offset of a clock which operates continuously (e.g., for minutes up to years) with respect to a signal stream, where the signal stream may carry on the order of gigabits to terabits per second across large distances (e.g., kilometers). According to some examples, the clock recovery may be implemented using any combination of a phase lock loop (PLL), a clock phase shift, a data phase shift, and a digital adaptive time-domain or frequency-domain samples interpolator.

Following the processing 332, processed digital signals 340 may undergo carrier recovery 342. Where the optical signal 304 is representative of symbols, the carrier recovery 342 may be used to recover symbol estimates 344, which may in turn undergo symbol-to-bit demapping 346 to recover bit estimates 348. Where the optical signal 304 is representative of symbols comprising FEC-encoded bits generated as a result of applying FEC encoding to client bits, the bit estimates 348 may further undergo FEC decoding 350 to recover the corrected client bits 302.

Although the adaptive linear equalizer is illustrated is being applied prior to the carrier recover 342, alternatively examples are contemplated wherein the equalizer is applied after the carrier recovery 342.

According to some examples, the processing 232 applied at the transmitter device 200 may include a first raised-root cosine filter, while the processing 332 applied at the receiver device 300 may include a second raised-root cosine filter.

The CD pre-compensation 234 and CD post-compensation 334 may be configured to balance out the net CD in a communication link between the transmitter device 200 and the receiver device 300. In some cases, the net CD in the link may be known or may be estimated based, for example, on the fiber type(s) comprised in the link. Where the net CD of the link and the amount of CD pre-compensation are known, it may be possible to determine the appropriate amount of CD post-compensation needed to compensate for the residual CD in the link. However, where one or both of the net CD and amount of CD pre-compensation are unknown, it may be necessary to measure or estimate the residual CD in the link in order to determine how much CD post-compensation should be applied. Accordingly, the processing 332 may include CD estimation 336. Based on the digital signals 326, the CD estimation 336 may generate an estimate of the residual CD in the communications signal. This estimate may be used in the configuration of the CD post-compensation 334, as denoted by arrow 338.

As previously described, existing techniques for estimating the residual CD in a communications signal may be sensitive to clock frequency offset between the transmitter device and the receiver device. Existing techniques may also be sensitive to optical impairments such as DGD and PDL. Furthermore, techniques for CD estimation that rely on sweeping through a series of values of the CD coefficient may be slow.

This document proposes technology for CD estimation that may avoid one or more disadvantages of existing methods. The techniques for CD estimation described herein do not rely on sweeping, and may therefore be performed more quickly than sweeping-based methods. The proposed techniques do not require any prior knowledge of transmitter signal patterns, and are independent of clock phase/frequency offset and laser frequency-error. Accordingly, the techniques may be applied during the first stages of receiver modem start-up, when the DSP circuit(s) of the receiver are not yet functioning properly. In addition, some of the methods for CD estimation described herein are also independent of DGD and PDL. Examples of the proposed technology for CD estimation will now be described with reference to the frequency spectrum illustrated in FIG. 4.

Figure 4:
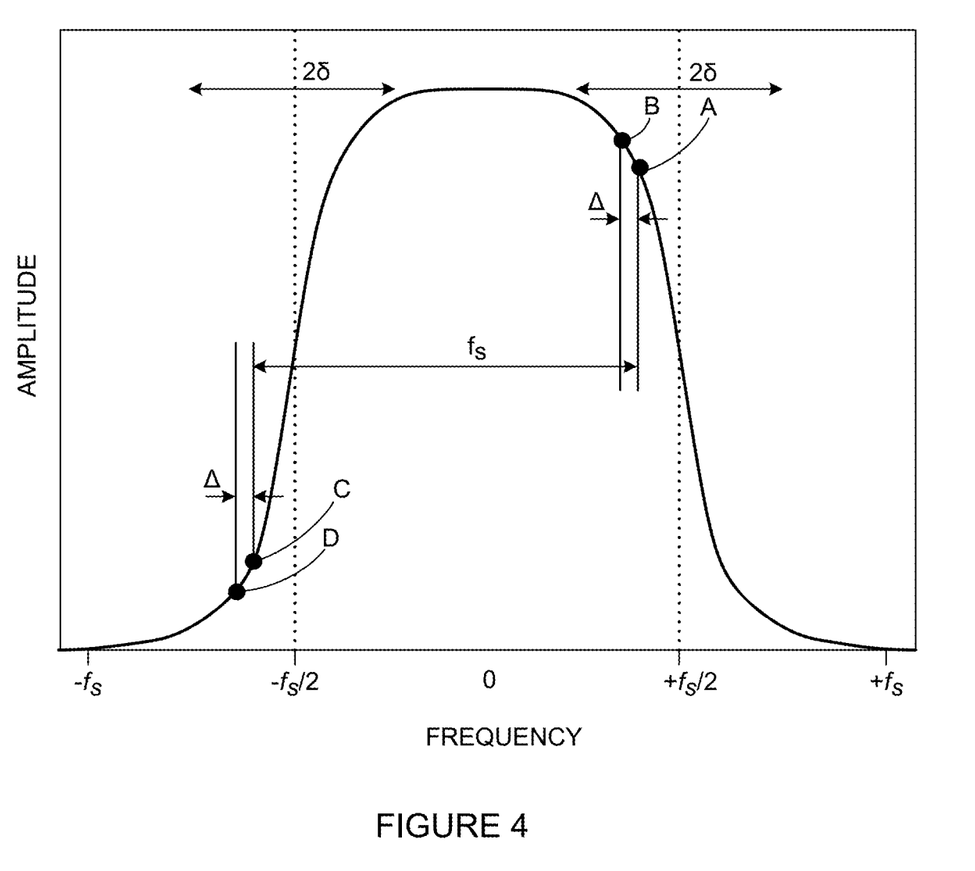
FIG. 4 illustrates an example frequency spectrum of a communications signal.

FIG. 4 illustrates an example representation of a communications signal in the frequency domain, and an example set of components which may be used to calculate an estimate of residual CD in the communications signal, in accordance with some examples of the technology disclosed herein.

The representation shown in FIG. 4 reflects amplitude as a function of frequency, f, for a single polarization of the communications signal, where the communications signal conveys symbols at a symbol frequency denoted by $f_S$. For a communications signal transmitting data in a plurality of polarizations, it is contemplated that a respective plurality of representations may be generated.

As a result of the use of a raised cosine filter, the representation of the communications signal in the frequency domain comprises a positive roll-off region and a negative roll-off region, which are reflected by the amplitudes shown in FIG. 4. The positive roll-off region is defined by those frequencies, f, within a band of width $2\delta$ that is centered at $f_S/2$, while the negative roll-off region is defined by those frequencies, f, within a band of width $2\delta$ that is centered at $-f_S/2$, where the value of $\delta$ is dependent on the value of the roll-off factor $\rho$ of the raised cosine, and satisfies $\delta < f_S/2$. Collectively, the positive roll-off region and the negative roll-off region may be referred to as the Godard band, and may comprise those frequencies which satisfy $f_S/2-\delta \leq |f| \leq f_S/2+\delta$.

FIG. 4 illustrates a representation of the amplitude of a communications signal at a single time interval. For example, the representation may correspond to a single FFT block. It is contemplated that, for any given time interval, a different representation may be calculated. According to some examples, a plurality of different representations may be calculated corresponding to a respective plurality of time intervals. In the following calculations, $r_b$ denotes a representation of a communications signal at the $b^{th}$ time interval, where b is an index representing a particular time interval or FFT block, and where $r_b$ is a function of frequency.

In FIG. 4, points A and B denote example components of the representation at a first pair of frequencies within the positive roll-off region, where the first pair of frequencies is separated by a gap denoted by $\Delta$. The gap $\Delta$ may denote the gap between FFT bins. Because the frequencies of points A and B are both within the positive roll-off region, it is implicit that $\Delta < 2\delta$. According to some examples, $\Delta << 2\delta$. According to some examples, $\Delta=1$ or $\Delta=2$. The representation at point A is expressed as $r_b(f)$, while the representation at point B is expressed as $r_b(f-\Delta)$, where the frequency f may take on any value satisfying $f_S/2-\delta \leq f \leq f_S/2+\delta$.

Points C and D are example components of the representation at a second pair of frequencies within the negative roll-off region, where the second pair of frequencies is separated by the gap $\Delta$. The higher frequency of the first pair (i.e., the frequency of point A) and the higher frequency of the second pair (i.e., the frequency of point C) are separated by the symbol frequency $f_S$. Similarly, the lower frequency of first pair (i.e., the frequency of point B) and the lower frequency of the second pair (i.e., the frequency of point D) are separated by the symbol frequency $f_S$. Thus, the representation at point C is expressed as $r_b(f-f_S)$, while the representation at point D is expressed as $r_b(f-f_S-\Delta)$.

According to some examples, a first term $\hat{r}_b(f)$ may be calculated which comprises a function of a phase difference between the representations of the communications signal at the first pair of frequencies (f, f-$\Delta$), and a second term $\hat{r}_b(f-f_S)$ may be calculated which comprises a function of a phase difference between the representations of the received signal at the second pair of frequencies (f-$f_S$, f-$f_S$-$\Delta$). The first term and the second term may be referred to as differential phase terms.

According to one example, the first term $\hat{r}_b(f)$ may comprise a difference between an angle of the representation at one of the first pair of frequencies (e.g., f) and an angle of the representation at the other of the first pair of frequencies (e.g., f-$\Delta$), as provided by Equation 1. Similarly, the second term $\hat{r}_b(f-f_S)$ may comprise a difference between an angle of the representation at one of the second pair of frequencies (e.g., f–$f_S$) and an angle of the representation at the other of the second pair of frequencies (e.g., f–$f_S$–Δ), as provided by Equation 2.

$$\hat{r}_b(f) := \angle r_b(f) - \angle r_b(f-\Delta) \quad [1]$$

$$\hat{r}_b(f-f_S) := \angle r_b(f-f_S) - \angle r_b(f-f_S-\Delta) \quad [2]$$

where $\angle r_b(f)$ denotes the angle of the representation at the frequency f, and where the frequency f may take on any value within the positive roll-off region, that is, any value satisfying $f_S/2 - \delta \leq f \leq f_S/2 + \delta$.

According to another example, the first term $\hat{r}_b(f)$ and the second term $\hat{r}_b(f-f_S)$ may be calculated using complex conjugate multiplication according to Equations 3 and 4, respectively:

$$\hat{r}_b(f) := r_b(f) r_b^*(f-f_S-\Delta) \quad [3]$$

$$\hat{r}_b(f-f_S) := r_b(f-f_S) r_b^*(f-f_S-\Delta) \quad [4]$$

where $r_b^*$ denotes the complex conjugate of $r_b$, and where the frequency f may take on any value satisfying $f_S/2 - \delta \leq f \leq f_S/2 + \delta$.

In general, the first term $\hat{r}_b(f)$ may comprise a function of the phase difference between $r_b(f)$ and $r_b(f-\Delta)$, and the second term $\hat{r}_b(f-f_S)$ may comprise a function of the phase difference between $r_b(f-f_S)$ and $r_b(f-f_S-\Delta)$. The phrases "first term" and "second term" are used for ease of explanation and should not be considered limiting. Indeed, as used herein, the word "term" is not intended to necessarily be limited to a single value, but instead may comprise a combination or function of multiple values. For example, the first term $\hat{r}_b(f)$ provided by Equation 1 may actually be described as a combination of two values, namely $\angle r_b(f)$ and $\angle r_b(f-\Delta)$. In this case, the act of "calculating the first term" may be understood to refer to the calculation of the combination of values $\angle r_b(f)$ and $\angle r_b(f-\Delta)$, or the calculation of the result $\hat{r}_b(f)$, or both.

As will be described in more detail below, an estimate of the residual CD in a communication signal may be calculated based on the first term $\hat{r}_b(f)$ and the second term $\hat{r}_b(f-f_S)$. For example, where the first term $\hat{r}_b(f)$ and the second term $\hat{r}_b(f-f_S)$ are calculated according to Equations 1 and 2, it may be mathematically shown that the CD coefficient β is proportional to the difference between these terms. Specifically, the CD coefficient β may be calculated based on the first term $\hat{r}_b(f)$ and the second term $\hat{r}_b(f-f_S)$ according to Equation 5:

$$\beta = -\frac{\hat{r}_b(f) - \hat{r}_b(f-f_S)}{4\pi\Delta f s} = \\ -\frac{\angle r_b(f) - \angle r_b(f-\Delta) - \angle r_b(f-f_S) + \angle r_b(f-f_S-\Delta)}{4\pi\Delta f s} \quad [5]$$

It may also be shown that this estimate for the CD coefficient β is independent of clock phase offset. This will be described in more detail below.

According to some examples, instead of estimating the residual CD directly from the first term $\hat{r}_b(f)$ and the second term $\hat{r}_b(f-f_S)$, these terms may first be used to calculate a complex metric $G_b$, where the angle of the complex metric, denoted $\angle G_b$, may be shown to be proportional to residual CD in the communications signals. For example, in the case of a single frequency, f, the complex metric $G_b$ may be calculated according to Equation 6 as follows:

$$G_b := \hat{r}_b(f) \hat{r}_b^*(f-f_S) \quad [6]$$

where $\hat{r}_b^*$ denotes the complex conjugate of $\hat{r}_b$.

In general, the phase of the complex metric $G_b$ may comprise a function of the difference between the phase of the first term $\hat{r}_b(f)$ and the phase of the second term $\hat{r}_b(f-f_S)$. The complex conjugate multiplication shown in Equation 6 is one example which satisfies this requirement.

Where the first term $\hat{r}_b(f)$ and the second term $\hat{r}_b(f-f_S)$ have been calculated using complex conjugate multiplication according to Equations 3 and 4, then Equation 6 may be rewritten as follows:

$$G_b := r_b(f) r_b^*(f-\Delta) r_b^*(f-f_S) r_b(f-f_S-\Delta) \quad [7]$$

Thus, the complex metric $G_b$ is a function of the representation of the communications signal at a first pair of frequencies (f, f–Δ), and a second pair of frequencies (f–$f_S$, f–$f_S$–Δ). Based on the relationship in Equation 7, the angle $\angle G_b$ may be calculated according to Equation 8 as follows:

$$\angle G_b = \angle r_b(f) \angle r_b(f-\Delta) - \angle r_b(f-f_S) + \angle r_b(f-f_S-\Delta) \quad [8]$$

It may be mathematically shown that the value of $\angle G_b$ provided by Equation 8 is proportional to the residual CD in the communications signal. Specifically, the relationship between $\angle G_b$ and the CD coefficient is provided by Equation 9:

$$\beta = -\frac{\angle G_b}{4\pi\Delta f s} \quad [9]$$

It follows that an estimate of the residual CD in a communication signal may be calculated based on an angle of the complex metric $G_b$ provided by Equation 7. Where the angle $\angle G_b$ has been calculated according to Equation 8, it will be apparent that the Equation 9 becomes identical to Equation 5. In both cases, the estimate of the CD coefficient β is based on a function of a phase difference between the representations of the communications signal at the first pair of frequencies (f, f–Δ), and a function of a phase difference between the representations of the received signal at the second pair of frequencies (f–$f_S$, f–$f_S$–Δ).

It may be helpful to distinguish the calculation of the complex metric $G_b$ in Equation 6 from the calculation of clock phase offset using the Godard method. Both calculations rely on frequency components that are within the roll-off regions of the raised cosine spectrum. However, according to the Godard method, a frequency component in one roll-off region is multiplied by the complex conjugate of a frequency component in the other roll-off region, where the two frequency components are separated by the symbol frequency $f_S$. For example, points A and C in FIG. 4 represent an example of a Godard pair that may be used to estimate the clock phase offset according to the Godard method. It may be shown that the product of one component $r_b(f)$ and the complex conjugate of another component $r_b^*(f-f_S)$ is proportional to the clock phase offset of the communications signal. This complex conjugate multiplication may be performed over a plurality of different Godard pairs within the Godard band, and the results may be averaged to obtain an estimate of the clock phase offset. In contrast, the proposed method for estimating the CD coefficient β may be understood as a modification of the Godard method in that, instead of the complex conjugate multiplication being applied directly to the components $r_b(f)$ and $r_b(f-f_S)$, the complex conjugate multiplication is instead applied to the differential values $\hat{r}_b(f)$ and $\hat{r}_b(f-f_S)$ which are defined, for example, by Equations 3 and 4. As a result of using the differential values, the clock phase offset term in the complex metric $G_b$ will be independent of any common timing delay, thereby resulting in an angle $\angle G_b$ that is robust to any clock phase offset between transmitter and receiver in the communications signal. Instead, the angle $\angle G_b$ can be used to provide an estimate of the residual CD in the communications signal.

The fact that the angle $\angle G_b$ is insensitive to clock phase offset while simultaneously being sensitive to residual CD may be understood by considering that a clock timing offset causes a linear phase ramp in the frequency domain, whereas channel CD provides a frequency response with quadrative phase behaviour in the frequency domain. The proposed method for estimating residual CD is based on the second order derivative of the channel phase response over frequency. The second order derivative of a linear curve is zero, and thus the value of the angle $\angle G_b$ is insensitive to any clock phase offset within one FFT frame. Taking the second order derivative of a quadratic curve results in the quadratic coefficient, such that the value of the angle $\angle G_b$ is representative of the channel CD. The insensitivity of the angle $\angle G_b$ to clock phase offset may be advantageous for estimation of the CD coefficient $\beta$ during the first stages of receiver device start-up, when the clock phase offset and frequency are not yet known or accounted for.

The complex metric $G_b$ provided by Equation 6 is based on a single first term $\hat{r}_b(f)$ and a single second term $\hat{r}_b(f-f_S)$, both of which are based on a single value of the frequency f. However, other examples are contemplated wherein a plurality of different versions of the first term $\hat{r}_b(f)$ are calculated at a respective plurality of different first pairs of frequencies $(f, f-\Delta)$, and a plurality of different versions of the second term $\hat{r}_b(f-f_S)$ are calculated at a respective plurality of different second pairs of frequencies $(f-f_S, f-f_S-\Delta)$, where $f=f_S/2-\delta f_S/2+\delta$. According to these examples, the complex metric $G_b$ may be calculated based on a combination of the plurality of different versions of the first term and the plurality of different versions of the second term, as provided by Equation 10, for example:

$$G_b := \sum_{f=\frac{f_S}{2}-\delta}^{\frac{f_S}{2}+\delta} \hat{r}_b(f)\hat{r}_b^*(f-f_S) \quad [10]$$

which denotes the summation over frequencies $f=f_S/2-\delta \ldots f_S/2+\delta$ of the product of the product of the first term $\hat{r}_b(f)$ and the complex conjugate of the second term $\hat{r}_b(f-f_S)$.

In the event that the different versions of the first term $\hat{r}_b(f)$ and the different versions of the second term $\hat{r}_b(f-f_S)$ are calculated according to Equations 3 and 4, respectively, the combination used to calculate the complex metric $G_b$ may involve the different versions of the first and second terms being weighted differently based on frequency. For example, as is apparent in FIG. 4, the amplitudes of $r_b(f)$ and $r_b(f-\Delta)$ are larger for frequencies that are in the range $f_S/2\delta \leq f \leq f_S/2$ than they are for frequencies that are in the range $f_S/2 \leq f \leq f_S/2+\delta$. It follows that the versions of the first term, when calculated using Equation 3, will be larger for lower frequencies than they are for higher frequencies. On the other hand, the amplitudes of $r_b(f-f_S)$ and $r_b(f-f_S-\Delta)$ are larger for frequencies that are in the range $-f_S/2 \leq f-f_S \leq -f_S/2+\delta$ than they are for frequencies that are in the range $-f_S/2-\delta \leq f-f_S \leq f_S/2$. It follows that the versions of the second term, when calculated using Equation 4, will be larger for higher frequencies than they are for lower frequencies. In other words, versions of the first and second terms that are calculated from frequencies of lower magnitude may be weighted more than versions of the first and second terms that are calculated from frequencies of higher magnitude. This frequency-based weighting of the first and second terms in the calculation of the complex metric $G_b$ may reduce the contribution from noisier terms with lower amplitudes.

According to some examples, where a plurality of different representations are calculated corresponding to a respective plurality of time intervals, a corresponding plurality of different versions of the complex metric $G_b$ may also be calculated. An estimate of the residual CD may then be calculated, for example, based on an angle of the sum of the plurality of different versions of the metric $G_b$. This calculation is provided in Equation 11 as follows:

$$\beta = -\frac{\angle \sum_{b=1}^{N}(G_b)}{4\pi \Delta f_S} \quad [11]$$

where the different versions of the complex metric $G_b$ are summed over N time intervals, and where $$\angle \sum_{b=1}^{N}(G_b)$$

denotes the angle of the result of the summation.

According to some examples, the estimate of residual CD may alternatively be calculated by first calculating the angle of each different version of $G_b$, and then calculating the average of those angles.

In the event that the estimate of residual CD is based on Equation 5 (i.e., without first calculating the complex metric $G_b$), it is contemplated that a plurality of different estimates of the CD coefficient $\beta$ could be calculated for a respective plurality of different values of f. The plurality of different estimates of the CD coefficient $\beta$ could then be averaged. The averaging could involve applying different weighting to estimates obtained at different frequencies. The estimates of the CD coefficient $\beta$ could also be averaged across time.

Thus far, the technique for residual CD estimation has been described in the context of a communications signal that is represented in a single polarization. However, the technique may be applied to representations of the communications signal in a plurality of polarizations.

For example, where the representations of the communications signal comprise an X polarization and a Y polarization, a first term and a second term may be calculated for each polarization. These calculations may be done, for example, in accordance with Equations 1 and 2, or Equations 3 and 4, and may result in a first term in the X polarization, $\hat{r}_{X,b}(f)$, a first term in the Y polarization, $\hat{r}_{Y,b}(f)$, a second term in the X polarization, $\hat{r}_{X,b}(f-f_S)$, and a second term in the Y polarization, $\hat{r}_{Y,b}(f-f_S)$. Where the estimation of residual CD involves the calculation of the complex metric $G_b$, the calculation would use a combination of these four terms. For example, the complex metric $G_b$ may be calculated according to Equation 12 as follows:

$$G_b := \hat{r}_{X,b}(f)\hat{r}_{X,b}^*(f-f_S) + \hat{r}_{X,b}(f)\hat{r}_{Y,b}^*(f-f_S) + \hat{r}_{Y,b}(f)\hat{r}_{X,b}^*(f-f_S) + \hat{r}_{Y,b}(f)\hat{r}_{Y,b}^*(f-f_S) \quad [12]$$

Similar to the complex metric $G_b$ calculated in Equation 7, the complex metric $G_b$ calculated in Equation 12 may be shown to have angle that is proportional to the residual CD in the communications signal and independent of any clock phase offset. However, advantageously, the angle of the complex metric $G_b$ calculated in Equation 12 is also independent of DGD, SOP rotation, and PDL. Indeed, it can be shown that the complex metric $G_b$ is proportional to the square of the Frobenius norm of the 2×2 channel matrix $H(f)H\dagger(f-f_S)$, where H (f) denotes the 2×2 channel response at a frequency f applied over the two input polarizations X and Y to obtain the output X and Y polarization values at the frequency f, and where H† denotes the Hermitian of H. As the Frobenius norm of a matrix is always a positive real number, it is expected that the angle $\angle G_b$ will not to be distorted by the channel PDL, DGD, or SOP realization.

The complex metric $G_b$ provided by Equation 12 is based on two different first terms $(\hat{r}_{X,b}(f), \hat{r}_{Y,b}(f))$ corresponding to the two polarizations X and Y, respectively, and two different second terms $(\hat{r}_{X,b}(f-f_S), \hat{r}_{Y,b}(f-f_S))$ corresponding to the two polarizations X and Y, respectively, where all four terms are based on a single value of the frequency f. However, other examples are contemplated wherein a plurality of different versions of the four terms $\hat{r}_{X,b}(f), \hat{r}_{Y,b}(f) \hat{r}_{X,b}(f-f_S) \hat{r}_{Y,b}(f-f_S)$ are calculated based on a respective plurality of different values of the frequency f, where $f=f_S/2-\delta \ldots f_S/2+\delta$. According to these examples, the complex metric $G_b$ may be calculated based on a combination of the plurality of different versions of the first and second terms, as provided by Equation 13, for example:

$$G_b := \sum_{f=\frac{f_S}{2}-\delta}^{\frac{f_S}{2}+\delta} \hat{r}_{X,b}(f)\hat{r}^*_{X,b}(f-f_S) + \hat{r}_{X,b}(f)\hat{r}^*_{Y,b}(f-f_S) + \hat{r}_{Y,b}(f)\hat{r}^*_{X,b}(f-f_S) + \hat{r}_{Y,b}(f)\hat{r}^*_{Y,b}(f-f_S) \quad [13]$$

As described previously, a plurality of values of the complex metric $G_b$ may be calculated for a respective plurality of representations, where each representation corresponds to a different time interval. An estimate of the residual CD in the communications signal may then be calculated, for example, using Equation 11.

According to Equations 9 and 11, the relationship between the CD coefficient β and the angle $\angle G_b$ is inversely proportional to the value of the gap Δ. Thus, for a given amount of uncertainty or noise in the angle $\angle G_b$, an increase in the value of the gap Δ will decrease the uncertainty in the estimate of the CD coefficient β. It follows that a larger value of the gap Δ may provide an estimate of the CD coefficient β that is less sensitive to noise. However, a larger value of the gap Δ will also increase the likelihood that the angle $\angle G_b$ due to the residual CD will meet or exceed a value of 2π, which will result in phase wrapping. Any phase wrapping would lead to ambiguity in the estimate of the CD coefficient β. To take advantage of the reduced noise sensitivity of the estimate obtained from a larger value of the gap Δ while also avoiding ambiguity, it is contemplated that two or more versions of the complex metric $G_b$ may be calculated, each based on a different value of the gap Δ. For example, one version of the complex metric $G_b$ may be calculated using a smaller value of the gap Δ, and another version of the complex metric $G_b$ may be calculated using a larger value of the gap Δ. The value of the CD coefficient β that is calculated using the smaller value of Δ may provide a rough estimate that is unambiguous with respect to phase wrap. This rough estimate may then be improved using the value of β that is calculated based on the larger value of Δ to adjust the rough estimate calculated using the smaller value of Δ. In this manner, it may be possible to obtain an estimate of β that is unambiguous and less sensitive to noise than the estimate obtained using the smaller value of Δ alone.

Once an estimate of the CD coefficient β has been calculated, the estimate may be used to determine how much CD post-compensation is to be applied at the receiver device. Alternatively or additionally, the estimate may be used to adjust how much CD pre-compensation is being applied at the transmitter device.

Figure 5:
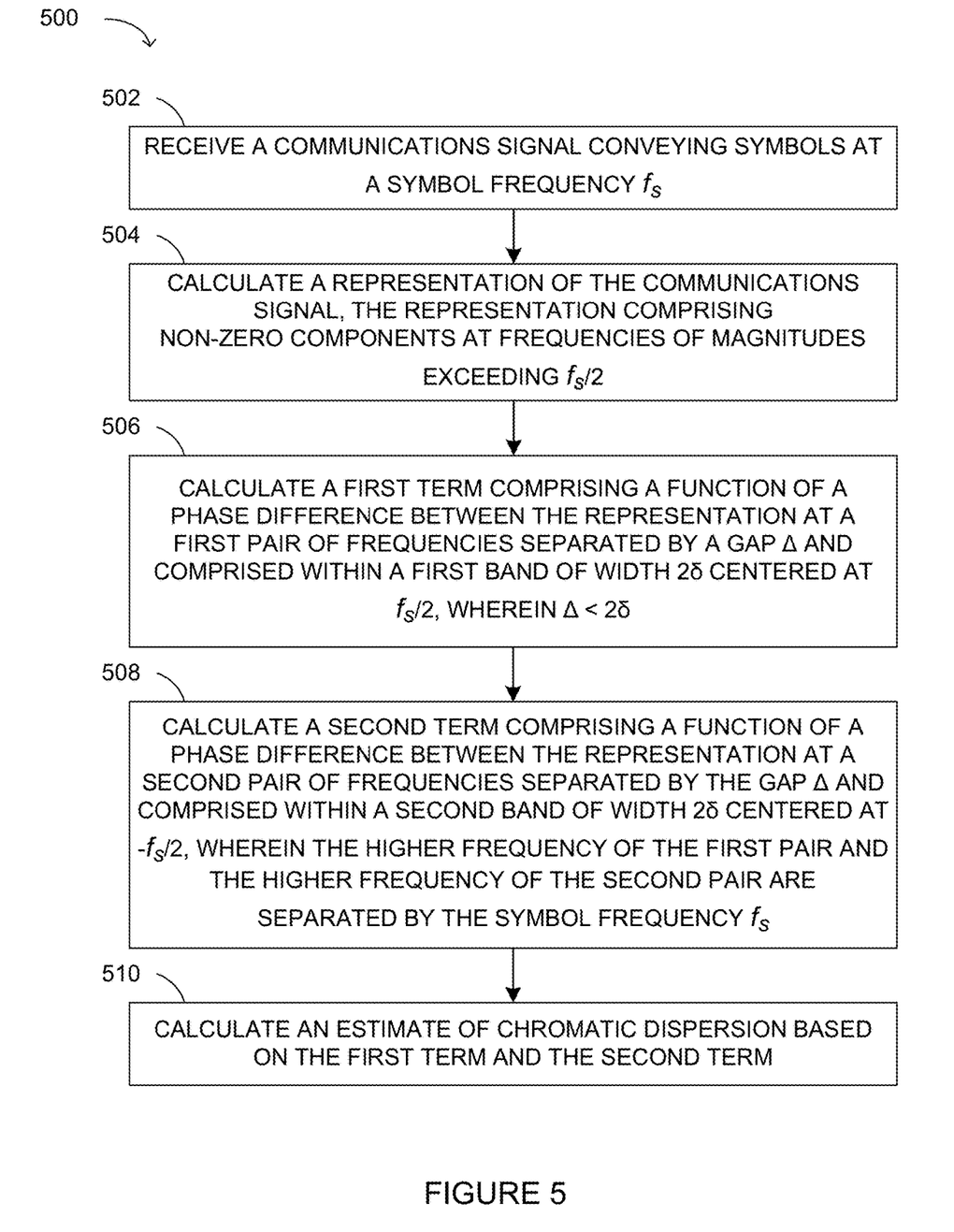
FIG. 5 illustrates an example method for estimation of chromatic dispersion (CD) in accordance with some examples of the technology disclosed herein.

FIG. 5 illustrates an example method 500 for CD estimation in accordance with some examples of the technology disclosed herein. The method 500 may be performed at a receiver device, such as the receiver device 104 or 300. In general, the method 500 may be implemented using circuitry configured to perform the various steps of the method 500. The circuitry may comprise various combinations of processors (including DSPs), computer-readable media storing computer-executable instructions or code, ASICs, and the like.

At 502, a communications signal is received at the receiver device. The communications signal comprises a degraded version of a communications signal generated by a transmitter device. For example, the communications signal may comprise a degraded version of the optical signal 204 transmitted by the transmitter device 200, where the optical signal 204 is conveys a stream of symbols transmitted at a symbol frequency.

At 504, a representation of the communications signal received at 502 is calculated. For example, as described with respect to FIG. 3, the received optical signal 304 may be split into the polarized components 308 by the beam splitter 306, the optical hybrid 310 may process the polarized components 308 with respect to the optical signal 312 produced by the laser 314, and the resulting optical signals 316 output by the optical hybrid 310 may be converted to the analog signals 320. The ADCs 324 may sample the analog signals 320 at the sample frequency set to generate the respective digital signals 326. The representation may be based on the digital signals 326. Calculation of the representation may include the application of a FFT to the digital signals 326 generated over a particular time interval. In the frequency domain, the representation corresponding to a time interval b may be denoted by $r_b(f)$.

Importantly, the representation calculated at 504 comprises frequency components within the Godard band. That is, the representation comprises non-zero components at frequencies of magnitudes exceeding $f_S/2$. In other words, for at least some of the frequencies f that satisfy $f>f_S/2$, there are corresponding values of the representation that satisfy $|r_b(f)|\neq 0$. This requirement ensures that there is energy in the Godard band (i.e., the positive and negative roll-off regions). The frequency-domain signal vector $r_b(f)$ may comprise an up-sampled signal, as the ADC sampling rate is generally higher than the symbol frequency $f_S$ in order to accommodate for signal energy present in the Godard band. Down-sampling of the frequency-domain signal vector $r_b(f)$ may performed after estimating the residual CD, as described with respect to step 510.

At 506, a first term is calculated which is a function of a phase difference between the representation at a first pair of frequencies separated by a gap Δ and comprised within a first band of width 2δ that is centered at $f_S/2$. In other words, the first pair of frequencies are located in the positive roll-region of the Godard band. The width of the gap $\Delta$ is necessarily lower than the width $2\delta$ of the first band, that is $\Delta<2\delta$, since both frequencies of the first pair are within the first band. According to some examples, the width $2\delta$ of the first band may be lower than the symbol frequency $f_S$, that is $2\delta<f_S$. The calculation performed at 506 may be repeated for a plurality of different first pairs of frequencies, thereby generating a plurality of different versions of the first term. For a given time interval b, the first term(s) calculated at 506 may be denoted by $\hat{r}_b(f)$, where f may take on one or more values satisfying $f_S/2-\delta \leq f \leq f_S/2+\delta$.

At 508, a second term is calculated which is proportional to a phase difference between the representation at a second pair of frequencies separated by the gap $\Delta$ and comprised within a second band of width $2\delta$ that is centered at $-f_S/2$. In other words, the second pair of frequencies are located in the negative roll-region of the Godard band. The higher frequency of the first pair and the higher frequency of the second pair are separated by the symbol frequency $f_S$. Similarly, the lower frequency of the first pair and the lower frequency of the second pair are also separated by the symbol frequency $f_S$. The calculation performed at 508 may be repeated for a plurality of different second pairs of frequencies, thereby generating a plurality of different versions of the second term. For a given time interval b, the second term(s) calculated at 508 may be denoted by $\hat{r}_b(f-f_S)$, where f may take on one or more values satisfying $f_S/2-\delta \leq f \leq f_S/2+\delta$.

According to some examples, the first and second term(s) may be calculated based on the difference between the angles of the representations at the first and second pairs of frequencies, according to Equations 1 and 2, respectively. According to some examples, the first and second term(s) may be calculated using complex conjugate multiplication according to Equations 3 and 4, respectively. According to some examples, the actions at 506 and 508 may be performed simultaneously, or in the opposite order to that illustrated in FIG. 5. Furthermore, where the estimate of residual CD in the communications signal is to be based on a plurality of different representations of the communications signal calculated at 504 for a corresponding plurality of time intervals, the actions at 506 and 508 may be repeated for each representation. The actions at 506 and 508 may be performed following each separate iteration of 504, or following the completion of all iterations of 504, or some variation thereof.

At 510, an estimate of residual CD in the communications signal is calculated based on at least one of the first term(s) calculated at 506 and at least one of the second term(s) calculated at 508. For example, an estimate of the CD coefficient $\beta$ may be calculated using Equation 5. Optionally, the estimate of residual CD may be based on an angle of a complex metric $G_b$, as provided by Equation 9, where the complex metric $G_b$ is calculated from some combination of the first term(s) and the second term(s). According to some examples, the calculation of the complex metric $G_b$ may comprise complex conjugate multiplication as provided, for example, in Equation 6 or Equation 7 (in the case of a single polarization) or Equation 12 (in the case of two polarizations). According to some examples, the estimate of residual CD may be based on a plurality of different versions of the first term and the second term, corresponding to a respective plurality of values of the frequency f. For example, where the estimate of residual CD is based on the complex metric $G_b$, the calculation of the complex metric $G_b$ may be performed, for example, according to Equation 10 (in the case of a single polarization) or Equation 13 (in the case of two polarizations). According to some examples, the estimate of residual CD may be based on a plurality of different representations of the communications signal, corresponding to a respective plurality of time intervals. For example, where the estimate of residual CD is based on the complex metric $G_b$, the calculation of the CD coefficient $\beta$ may performed using Equation 11. Alternatively, an estimate of the CD coefficient $\beta$ may be calculated by first calculating the angle of each different version of $G_b$, and then calculating the average of those angles, as described previously.

The calculations in the method 500 may be implemented as part of the CD estimation 336 described with respect to FIG. 3. Although not shown in FIG. 5, the estimate of residual CD calculated at 510 may be used in the configuration of the CD post-compensation 334, as denoted by the arrow 338. Although the calculations have been described as being performed in the frequency domain, they may alternatively be performed in the time domain. The algorithm for estimation of residual CD may be fully applied in ASIC hardware, or may be partly accomplished by a low-speed firmware processor and/or FPGA which assists the ASIC in the residual CD calculation.

According to the method 500, it may be possible to obtain an estimate of residual CD that is independent of clock phase offset, and optionally independent of DGD, SOP rotation, and PDL. Thus, the method 500 may be performed during the first stages of start-up of a receiver device, prior to the clock recovery circuit being activated. Furthermore, because the method 500 does not rely on sweeping, it may be used to calculate an estimate of residual CD more quickly than some existing methods.

The scope of the claims should not be limited by the details set forth in the examples, but should be given the broadest interpretation consistent with the description as a whole.

What is claimed is:

1. A receiver apparatus comprising:
    a communication interface configured to receive a communications signal conveying symbols at a symbol frequency $f_S$; and
    circuitry configured to
        calculate a representation of the communications signal, wherein the representation comprises non-zero components at frequencies of magnitudes exceeding $f_S/2$;
        calculate a first term comprising a function of a phase difference between the representation at a first pair of frequencies separated by a gap $\Delta$ and comprised within a first band of width $2\delta$ centered at $f_S/2$, wherein $\Delta<2\delta$;
        calculate a second term comprising a function of a phase difference between the representation at a second pair of frequencies separated by the gap $\Delta$ and comprised within a second band of width $2\delta$ centered at $-f_S/2$, wherein the higher frequency of the first pair and the higher frequency of the second pair are separated by the symbol frequency $f_S$; and
        calculate an estimate of chromatic dispersion (CD) in the communications signal based on the first term and the second term.

2. The receiver apparatus as claimed in claim 1, wherein the circuitry is configured to
    calculate a complex metric using the first term and the second term; and
    calculate the estimate of CD in the communications signal based on an angle of the complex metric.

3. The receiver apparatus as claimed in claim 2, wherein the circuitry is configured to
calculate the complex metric using complex conjugate multiplication.

4. The receiver apparatus as claimed in claim 1, wherein the circuitry is configured to
calculate the first term and the second term using complex conjugate multiplication.

5. The receiver apparatus as claimed in claim 1, wherein the circuitry is configured to
calculate a plurality of different versions of the first term at a respective plurality of different first pairs of frequencies;
calculate a plurality of different versions of the second term at a respective plurality of different second pairs of frequencies; and
calculate the estimate of CD in the communications signal based on a combination of the plurality of different versions of the first term and the plurality of different versions of the second term.

6. The receiver apparatus as claimed in claim 5, wherein the combination applies different weights to the different versions of the first term based on respective magnitudes of the different first pairs of frequencies, and wherein the combination applies different weights to the different versions of the second term based on respective magnitudes of the different second pairs of frequencies.

7. The receiver apparatus as claimed in claim 2, wherein the circuitry is configured to
calculate a plurality of different representations of the communications signal corresponding to a respective plurality of time intervals;
calculate a plurality of different versions of the complex metric corresponding to the respective plurality of different representations; and
calculate the estimate of CD in the communications signal based on the plurality of different versions of the complex metric.

8. The receiver apparatus as claimed in claim 7, wherein the circuitry is configured to
calculate a summation of the plurality of different versions of the complex metric; and
calculate the estimate of CD in the communications signal based on an angle of the summation.

9. The receiver apparatus as claimed in claim 1, wherein the representation comprises frequency components corresponding to a plurality of polarizations, and wherein the circuitry is configured to
calculate a plurality of first terms corresponding to the respective plurality of polarizations;
calculate a plurality of second terms corresponding to the respective plurality of polarizations; and
calculate the estimate of CD in the communications signal based on the plurality of first terms and the plurality of second terms.

10. The receiver apparatus as claimed in claim 2, wherein the circuitry is configured to
calculate a new version of the complex metric based on a different value of the gap $\Delta$; and
adjust the estimate of CD based on the new version of the complex metric.

11. A method performed at a receiver apparatus, the method comprising:
receiving a communications signal conveying symbols at a symbol frequency $f_S$;
calculating a representation of the communications signal, wherein the representation comprises non-zero components at frequencies of magnitudes exceeding $f_S/2$;
calculating a first term comprising a function of a phase difference between the representation at a first pair of frequencies separated by a gap $\Delta$ and comprised within a first band of width $2\delta$ centered at $f_S/2$, wherein $\Delta < 2\delta$;
calculating a second term comprising a function of a phase difference between the representation at a second pair of frequencies separated by the gap $\Delta$ and comprised within a second band of width $2\delta$ centered at $-f_S/2$, wherein the higher frequency of the first pair and the higher frequency of the second pair are separated by the symbol frequency $f_S$; and
calculating an estimate of chromatic dispersion (CD) in the communications signal based on the first term and the second term.

12. The method as claimed in claim 11, further comprising
calculating a complex metric using the first term and the second term; and
calculating the estimate of CD in the communications signal based on an angle of the complex metric.

13. The method as claimed in claim 12, further comprising
calculating the complex metric using complex conjugate multiplication.

14. The method as claimed in claim 11, further comprising
calculating the first term and the second term using complex conjugate multiplication.

15. The method as claimed in claim 11, further comprising
calculating a plurality of different versions of the first term at a respective plurality of different first pairs of frequencies;
calculating a plurality of different versions of the second term at a respective plurality of different second pairs of frequencies; and
calculating the estimate of CD in the communications signal based on a combination of the plurality of different versions of the first term and the plurality of different versions of the second term.

16. The method as claimed in claim 15, wherein the combination applies different weights to the different versions of the first term based on respective magnitudes of the different first pairs of frequencies, and wherein the combination applies different weights to the different versions of the second term based on respective magnitudes of the different second pairs of frequencies.

17. The method as claimed in claim 12, further comprising
calculating a plurality of different representations of the communications signal corresponding to a respective plurality of time intervals;
calculating a plurality of different versions of the complex metric corresponding to the respective plurality of different representations; and
calculating the estimate of CD in the communications signal based on the plurality of different versions of the complex metric.

18. The method as claimed in claim 17, further comprising
calculating a summation of the plurality of different versions of the complex metric; and
calculating the estimate of CD in the communications signal based on an angle of the summation.

19. The method as claimed in claim 11, wherein the representation comprises frequency components corresponding to a plurality of polarizations, the method further comprising
- calculating a plurality of first terms corresponding to the respective plurality of polarizations;
- calculating a plurality of second terms corresponding to the respective plurality of polarizations; and
- calculating the estimate of CD in the communications signal based on the plurality of first terms and the plurality of second terms.

20. The method as claimed in claim 12, further comprising
- calculating a new version of the complex metric based on a different value of the gap $\Delta$; and
- adjusting the estimate of CD based on the new version of the complex metric.

* * * * *

UNITED STATES PATENT AND TRADEMARK OFFICE
CERTIFICATE OF CORRECTION

PATENT NO. : 10,819,432 B1
APPLICATION NO. : 16/687521
DATED : October 27, 2020
INVENTOR(S) : Shahab Oveis Gharan and Lukas Jakober It is certified that error appears in the above-identified patent and that said Letters Patent is hereby corrected as shown below:

In the Specification

Column 1, Line 56 should read:
"first band of width $2\delta$ centered at fs/2, where $\Delta<2\delta$. The"

In the Claims

Column 20, Line 7 should read:
"a first band of width $2\delta$ centered at fs/2, wherein $\Delta<2\delta$;"

Signed and Sealed this
Twenty-fourth Day of November, 2020

Andrei Iancu
*Director of the United States Patent and Trademark Office*